United States Patent [19]
Hirt

[11] Patent Number: 5,092,800
[45] Date of Patent: Mar. 3, 1992

[54] TRANSMISSION POSITIONING SYSTEM

[75] Inventor: Manfred Hirt, Augsburg, Fed. Rep. of Germany

[73] Assignee: Renk Tacke GmbH, Augsburg, Fed. Rep. of Germany

[21] Appl. No.: 672,142

[22] Filed: Mar. 18, 1991

Related U.S. Application Data

[63] Continuation of Ser. No. 391,420, Aug. 9, 1989, abandoned.

[30] Foreign Application Priority Data

Aug. 11, 1988 [DE] Fed. Rep. of Germany ....... 3827240

[51] Int. Cl.⁵ .............................................. B63H 1/15
[52] U.S. Cl. ...................................... 440/52; 248/550
[58] Field of Search ........................ 440/49, 52, 111; 364/431.08; 248/638, 669, 647, 550

[56] References Cited

U.S. PATENT DOCUMENTS

| | | | |
|---|---|---|---|
| 3,929,089 | 12/1975 | Lambrecht | 440/52 |
| 4,795,123 | 1/1989 | Forward | 248/550 |
| 4,796,873 | 1/1989 | Schubert | 248/550 |
| 4,821,205 | 1/1989 | Schutten | 248/638 |
| 4,850,261 | 7/1989 | Greene | 248/638 |
| 4,869,474 | 9/1989 | Best | 248/550 |

FOREIGN PATENT DOCUMENTS 3516903 11/1986 Fed. Rep. of Germany .

Primary Examiner—Joseph F. Peters, Jr.
Assistant Examiner—Clifford T. Bartz
Attorney, Agent, or Firm—Natter & Natter

[57] ABSTRACT

A transmission mounting system includes a plurality of adjustable support units which are positioned between a transmission and supporting or reference surfaces. Each support unit includes a relatively yieldable elastic bearing and an extensible-retractible spacing link arranged in tandem. Signals indicative of the distance between transmission and the support surface are generated by a sensor and received by a control unit. The control unit effects dimension changes in the spacing link which compensate for deformation of the elastic bearing.

12 Claims, 1 Drawing Sheet

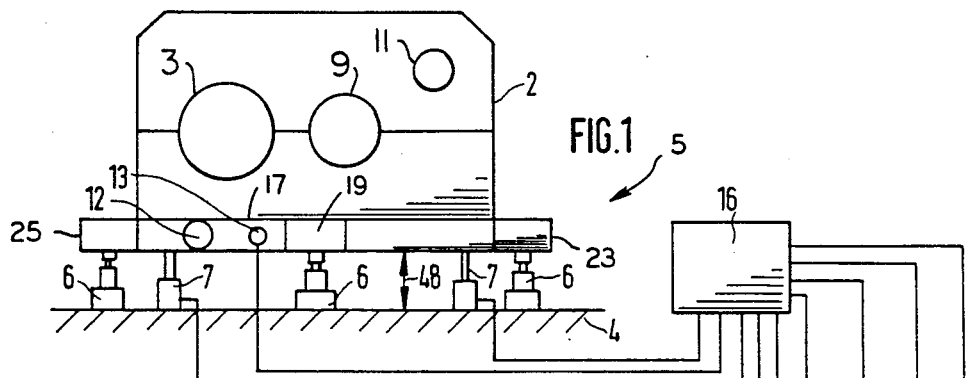
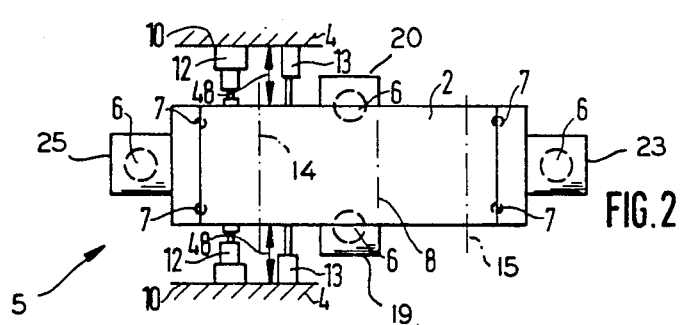
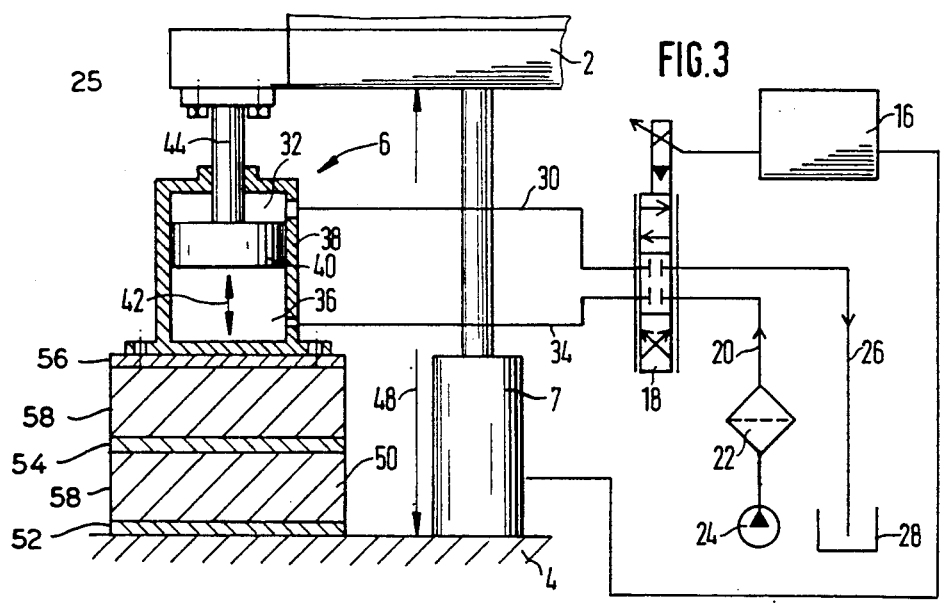

5,092,800

TRANSMISSION POSITIONING SYSTEM

This application is a continuation, of application Ser. No. 07/391420, filed 8/9/89 now abandoned.

BACKGROUND OF THE INVENTION

1. Field of the Invention

This invention relates generally to transmission mounting device and more particularly to a shock and vibration damping system for transmissions such as marine transmissions.

2. Background Art

Various mounting systems have heretofore been employed for transmissions. German patent document DE OS 35 16 903, illustrated a transmission damping and positioning system which included a rigid bearing upon which the transmission was centrally supported in combination with laterally spaced yieldable mounts. The yieldable mounts comprised, for example, rubber buffers, springs, or shock absorbers and served to attenuate vibrations, changes in torque loads, structure borne vibrations and accompanying noises. In addition, the yieldable mounts also compensated for structural changes in the supporting base relative to the transmission. For example, a ship's hull was subject to deformation which resulted in variations between the relative positions of the ship's drive system including transmissions, motors and the bearings for the ship's screw shafts.

These structural deformations frequently led to damage of drive system components. As a result, the ship's screw shafts were required to be interconnected to transmissions through elastic couplings. The couplings utilized were relatively large, heavy and costly.

Due to the necessity of reducing relative displacement between drive system components, prior transmission bearings were required to be relatively hard. Transmission vibration, deformations of the hull, torque shocks or impacts from the motor or from the ship's screw shafts resulted in relatively significant positional changes of the transmission with respect to the remaining drive system components when yieldable elastic components were used for bearings.

The utilization of relatively hard bearings permitted compensation of some of the positional changes of the drive system components relative to one another. Utilization of relatively hard bearings did not adequately provide for noise attenuation or adequately compensate for system shocks. The degree of permitted elasticity was limited since excessive elasticity resulted in damage to the transmission, the motor or the screw shaft due to the relative movement of the components.

As a result of the conflicting requirements for transmission mounting systems, known mounting systems, at best, provided but a compromise with respect to desired results.

SUMMARY OF THE INVENTION

Briefly, the present invention comprises a damping and positioning transmission mount system which includes a plurality of adjustable support units. The support units are positioned between a transmission and support or reference surfaces. Each support unit includes an elastic bearing which is readily deformable in a support direction and a hydraulic spacing link which is extensible and retractible in the support direction. Both the bearing and the spacing link are arranged in tandem, i.e. one after the other, between the support surface and the transmission.

Sensors are provided for indicating changes in the distance between the transmission and the support or reference surface at each adjustable support unit due to deformation of the elastic bearing. A control unit connected to the sensors actuates a hydraulic circuit to provide compensating changes in the length of each spacing link to maintain the distance between the transmission and the support or reference surface substantially constant regardless of the dimensional changes of the elastic bearings.

From the foregoing compendium, it will be appreciated that it is an aspect of the present invention to provide a compensating transmission positioning system of the general character described which is not subject to the disadvantages of the background art aforementioned.

A consideration of the present invention is to provide a compensating drive system component positioning system of the general character described which achieves superior shock and vibration attenuation while preventing excessive displacement between drive system components.

A feature of the present invention is to provide a compensating transmission positioning system of the general character described which facilitates the usage of readily deformable bearings for improved shock, torque load and vibration attenuation without the associated disadvantages which would normally result from employment of readily deformable bearings.

Another feature of the present invention is to provide a compensating transmission positioning system of the general character described which includes a control system having a feed back loop for maintaining the position of a transmission relative to engaged drive system components.

Yet another feature of the present invention is to provide a compensating transmission positioning system of the general character described which includes a high degree of vibration and shock attenuation while minimizing relative displacement between drive system components.

Other aspects, features and considerations in part will be obvious and in part will be pointed out hereinafter.

With these ends in view, the invention finds embodiment in the various combinations of elements, arrangements of parts and series of steps by which the said aspects, features and considerations and certain other aspects, features and considerations are attained, all with reference to the accompanying drawings and the scope of which is more particularly pointed out and indicated in the appended claims.

BRIEF DESCRIPTION OF THE DRAWINGS

In the accompanying drawings, in which is shown one of the various possible exemplary embodiments of the invention, FIG. 1 is a schematized front elevational view of a compensating transmission mount system constructed in accordance with and embodying the invention and illustrating a typical marine transmission and a plurality of support units positioned between the transmission and a horizontal support surface;

FIG. 2 is a schematized plan view of the transmission and showing a pair of lateral reference surfaces with a support unit being positioned between the transmission and each lateral reference surface; and FIG. 3 is a schematized enlarged scale vertical sectional view through a support unit and showing a representation of a hydraulic circuit which is controlled to provide compensating changes in the length of a spacing link which forms part of the support unit.

DESCRIPTION OF THE PREFERRED EMBODIMENTS

Referring now in detail to the drawings, the reference numeral 5 denotes generally a transmission mount system constructed in accordance with and embodying the invention. The transmission mount system is configured to support and maintain the position of a transmission 2 which may comprise a component of a marine drive system.

The transmission 2, illustrated in schematized format in FIG. 1, includes three shafts, 3, 9, and 11 which rotate about axes 14, 8 and 15 respectively. By way of example, the shaft 11 may be driven by a ship motor; the shaft 3 is employed drives a screw shaft and the shaft 9 carries an intermediate gear. Alternately, the shaft 9 may be driven by the motor while the shaft 3 drives the screw shaft. The shaft 11 may be employed as a power take off output shaft for driving additional drive system or ship components such as oil pumps, generators, etc.

The transmission mount system 5 includes four vertical support units 6 which extend between a horizontal mounting flange 17 of the transmission 2 and a horizontal support surface of a base 4. From an observation of FIG. 2 it will be noted that the base 4 also includes a pair of lateral support surfaces 10 between which the transmission mounting flange 17 is positioned. Extending between each of the lateral support surfaces 10 and parallel surfaces of the transmission mounting flange 17, is a support unit 12, substantially identical in construction to the support units 6 previously mentioned.

It should be noted that the transmission mounting flange 17 includes at midlength, a forwardly projecting leg 19 and a rearwardly projecting leg 20, each of which engage a support unit 6. Similarly, a pair of legs 23, 25 project from the flange 17 at the right and left ends of the transmission.

Positioned near each end leg 23, 25 adjacent the front and rear of the flange 17, is a distance sensor 7. Similarly, extending between the flange 17 and the lateral support surfaces 10 and in close proximity to each support unit 12 is a further distance sensor 13. The distance sensors 7, 13 monitor the position of the flange 17 hence the transmission 2 relative to all support surfaces at the respective support units.

In accordance with the invention, an electronic control unit 16 which may comprise, for example, a microprocessor, receives, from each of the sensors 7, 13, signals indicating the measured distance between the transmission and the support surfaces at the respective associated support units, 6, 12 and/or signals indicating changes in such distances.

The control unit 16 generates signals for actuating a separate servo valve 18 which is associated with each support unit 6, 12 for controlling such support unit to provide a compensating adjustment.

Turning now to FIG. 3 wherein an enlarged scale cross sectional illustration of a typical support unit 6 is shown, it should be appreciated that the support unit 6 includes an elastic bearing 50 which comprises a sandwich or laminate formed of a plurality of plates 52, 54, 56 between which a pair of deformable elastic slabs 58 are positioned. The elastic slabs 58 preferably are yieldable under both compressive and tensile stresses. It should also be noted that the elastic bearing 50 rests on the horizontal support surface of the base 4.

Mounted in tandem with the elastic bearing 50 and interconnecting the upper plate 56 of the bearing 50 with the bottom of the transmission mounting flange leg 25 is an extensible and retractible spacing link 60. The spacing link 60 provides an adjustable span between the elastic bearing 50 and the support surface. A cylinder 38 of the spacing link 60 is mounted to the bearing 50 and a piston 40 reciprocally carried in the cylinder 38 includes an upwardly projecting piston rod 44. The distal end of the piston rod 44 is secured to the undersurface of the mounting flange leg 25.

Also depicted in FIG. 3 is a detailed schematized illustration of a servo valve 18 associated with the support unit 6. The servo valve 18 is connected to a source 24 of high pressure hydraulic fluid through a fluid line 20 which includes a suitable system filter 22. The servo valve 18 is also connected to a fluid discharge line 26 which empties into a convenient sump 28.

The piston 40 divides the cylinder 38 into an upper chamber, 32 which is connected to the servo valve 18 by a fluid line 30, and a lower cylinder chamber 36, which is connected to the servo valve 18 by a fluid line 34.

The spacing link 60 comprises a hydraulic distance compensating device for varying the span to compensate for dimensional changes of the elastic bearing 50 in a support direction indicated by a double headed arrow 42. The spacing link thus serves to maintain or stabilize the distance between the transmission 2 and the base 4 at the location of each support unit.

The distance to be stabilized is indicated by a double headed arrow 48 in each of the drawing figures. Changes in the distance 48 at each support unit 6, 12 occur due to compression or expansion of the elastic slabs 58 of the elastic bearings 50 in the support direction 42 of each support unit.

In the inactive or predetermined state of transmission operation, the distance 48 has a desired value at each respective support unit. Such value is determined by the positional relationships between the transmission and other drive system components. Vibrations in the transmission 2, torque shocks in the transmission, axial thrust and deformations of the base 4 or of the ship's hull result in variations in the actual values of the distances 48.

The spacing link 60 serves to maintain the instantaneous or measured value of the respective distances 48 relatively constant notwithstanding deformations of the elastic slabs 58. When the elastic bearing 50 is compressed in the support direction 42, the associated distance 48 is reduced and the sensors 7 transmit signals to the control unit 16 indicating the reduction of the distance 48. The control unit 16 thereafter provides an appropriate signal to the servo valve 18 which results in a corresponding lengthening of the spacer link 60 by extending the piston rod 44 upward as viewed in FIG. 3, a length corresponding to the distance which the elastic bearing 50 was compressed.

The desired movement of the piston rod 44 is provided by increasing the hydraulic pressure in the lower chamber 36 of the cylinder 38 and reducing the pressure in the upper chamber 32. In both cylinder chambers, 32, 36 the hydraulic pressure is maintained at an intensity such that the distance 48 is preserved at the desired level.

To effectuate the necessary pressure changes, the servo valve 18 is displaceable into one of three positions under appropriate signals from the control unit 16. In the position illustrated in FIG. 3, the fluid lines 30, 34 extending to the cylinder are not connected to either the feed line 20 or the discharge line 26. Thus, the piston 40 is fixedly maintained.

To effect upward movement of the piston rod 44, the servo valve is displaced downwardly, thereby interconnecting the feed line 20 with the lower chamber 36 while simultaneously interconnecting the upper chamber 32 with the discharge line 26. The piston 40 and the piston rod 44 move upward, increasing the span between the bearing and the transmission flange, raising the transmission mounting flange and the transmission and increasing the distance 48. When the sensed distance 48 corresponds to the predetermined desired value, the control unit 16 displaces the servo valve 18 upwardly to the FIG. 3 position, effectively sealing both of the piston chambers and preventing further movement of the piston rod.

If, due to torque load changes or other factors, the elastic bearing 50 expands in length in the support direction 42, the increased distance 48, as sensed by the sensors 7, causes the control unit 16 to generate a signal which displaces the servo valve 18 upwardly to connect the lower chamber 36 with the fluid discharge line 26, through the line 34 and, at the same time, connecting the upper chamber 32 to the feed line 20, through the fluid line 30. This results in increased fluid pressure in the upper chamber 32 and decreased fluid pressure in the lower chamber whereby the spacing link 60 reduces its length and decreases the span due to inward displacement of the piston rod 44. Such inward displacement of the piston rod 44 continues until the actual distance 48 has again reached the desired value after which the valve 18 is switched to the position shown in FIG. 3.

Each of the support units 6, 12 is controlled by a dedicated servo valve 18 in accordance with the circuit illustrated in FIG. 3 with a single control unit 16 generating signals to individually control each of the servo valves in response to the actual distance signals generated by each of the sensors 7, 13.

In view of the foregoing, it can be seen that the compensating transmission mount system of the present invention renders it feasible to use relatively soft yieldable bearings without the transmissions being subject to harmful displacements relative to the remaining drive system components. This provides a much more efficient and effective absorption of shocks, damping and vibration reduction attenuation than previously possible.

It should also be appreciated that although the mount system of the present invention has been described for use in conjunction with transmissions such as ship-transmissions, it may find application in various other systems and components and may readily be adapted for use as motor mounts or in other systems wherein shock and vibration isolation are desired yet relative movement of system components is to be avoided.

Thus it will be seen that there is provided a compensating transmission mount system which achieves the various aspects, features and considerations of the present invention and which is well suited to meet the conditional of practical usage.

As various possible further embodiments might be made of the present invention, and as various changes might be made in the illustrative embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. A positioning system for mounting a drive system component relative to a support surface, the system comprising a support unit, the support unit including yieldable bearing means and spacer link means, the support unit being subject to load forces applied in a support direction between the component and the support surface, the yieldable bearing means changing a dimension in the support direction in response to changes in applied load forces, the yieldable bearing means and the spacer means being positioned in tandem between the component and the support surface, the spacer means including a cylinder and a piston, the piston being positioned within the cylinder for movement in the support direction, the system further including hydraulic means connected to the cylinder for varying the position of the piston, the hydraulic means including an electrically operated valve, means for sensing changes in the distance between the component and the support surface in the support direction as a result of changes in the dimension of the yieldable bearing means, said means for sensing changes generating a sensing signal, means receiving said sensing signal and in response thereto generating a signal indicative of the direction of necessary spacer means dimension change to compensate for changes in the dimension of the yieldable bearing means, the electrically operated valve receiving the signal indicative of the direction of necessary spacer means dimension change and actuating the hydraulic means in response thereto, whereby deformation of the yieldable bearing means is compensated.

2. A compensating positioning system for mounting a drive system component as constructed in accordance with claim 1 wherein the distance between the component and the support surface at the support unit has an established desired value, the means for generating a signal including means for determining whether the actual distance between the component and the support surface at the support unit is greater or less than the desired value.

3. A positioning system for mounting a drive system component as constructed in accordance with claim 1, wherein the drive system component comprises a marine transmission and the elastic bearing comprises a plurality of deformable elastic slabs and a plurality of plates, the slabs being positioned between the plates, in tandem, one after the other, in the support direction.

4. A positioning system for mounting a drive system component as constructed in accordance with claim 1 wherein the support surface is substantially horizontal, the support unit bearing at least a portion of the weight of the component.

5. A positioning system for mounting a drive system component as constructed in accordance with claim 4 wherein a plurality of support units are provided, each support unit bearing a portion of the weight of the component.

6. A positioning system for mounting a drive system component as constructed in accordance with claim 4 wherein a further support surface is positioned laterally of the component, the system including a further support unit, the further support unit providing lateral support for the component.

7. A positioning system for mounting a drive system component as constructed in accordance with claim 1 wherein the support surface is positioned laterally of the component, the support unit providing lateral support for the component.

8. A positioning system for mounting a drive system component as constructed in accordance with claim 7 further including a plurality of support units, each support unit providing lateral support for the component.

9. A positioning system for mounting a drive system component as constructed in accordance with claim 1 wherein the means for generating a signal includes an electronic control unit.

10. A positioning system for mounting a drive system component as constructed in accordance with claim 9 including a plurality of support units, each support unit including yieldable bearing means and spacer means, the electronic control unit for changing the dimensions of all of the spacer means.

11. A damping and positioning system for mounting a marine transmission on a support surface, the system including at least two support units for supporting the transmission from spaced locations on the support surface, each support unit including an elastic bearing and a spacer link positioned serially one after the other in a support direction, the elastic bearing being deformable in the support direction, the spacer link comprising a hydraulic distance compensating device, the hydraulic distance compensating device being extensible and retractable for changing its length in the support direction, the hydraulic distance compensating device including a cylinder and a piston for supporting the transmission, the piston being carried within the cylinder, the system further including an electrically operated valve means, the valve means including means for directing hydraulic fluid to displace the piston within the cylinder, the system further including a single electronic control unit and means for sensing changes in the distance between the transmission and the support surface adjacent each of the spaced locations as a result of deformation of the elastic bearing, the means for sensing changes being interconnected with the electronic control unit, the electronic control unit being operatively interconnected with the electrically operated valve means for changing the length of each hydraulic distance compensating device in the support direction opposite to the deformation of the elastic bearing associated with the hydraulic distance compensating device.

12. A damping and positioning system for mounting a marine transmission on a support surface, the system including at least one support unit for supporting the transmission on the support surface, the support unit including an elastic bearing and a spacer link positioned serially one after the other in a support direction, the elastic bearing being deformable in the support direction, the spacer link comprising a hydraulic distance compensating device, the hydraulic distance compensating device being extensible and retractable for changing its length in the support direction, the hydraulic distance compensating device including a cylinder and a piston for supporting the transmission, the piston being carried within the cylinder, the system further including electrically operated valve means, the valve means including means for directing hydraulic fluid to displace the piston within the cylinder as a function of changes in the distance between the transmission and the support surface resulting from deformation of the elastic bearing, whereby the hydraulic distance compensating device changes its length in the support direction to compensate for changes in the length of the elastic bearing.

* * * * *